US 12,243,298 B2

(12) United States Patent
Toews et al.

(10) Patent No.: US 12,243,298 B2
(45) Date of Patent: Mar. 4, 2025

(54) SYSTEM, METHOD AND APPARATUS FOR OBTAINING SENSITIVE AND SPECIFIC PREDICTIONS FROM DEEP NEURAL NETWORKS

(71) Applicant: LITTLE ANGEL MEDICAL INC., Pointe-Claire (CA)

(72) Inventors: Matthew Toews, Montréal (CA); James Lee, Pointe-Claire (CA)

(73) Assignee: LITTLE ANGEL MEDICAL INC., Pointe-Claire (CA)

( * ) Notice: Subject to any disclaimer, the term of this patent is extended or adjusted under 35 U.S.C. 154(b) by 382 days.

(21) Appl. No.: 17/684,002

(22) Filed: Mar. 1, 2022

(65) Prior Publication Data

US 2022/0301297 A1 Sep. 22, 2022

Related U.S. Application Data

(60) Provisional application No. 63/161,926, filed on Mar. 16, 2021.

(51) Int. Cl.
*G06V 10/82* (2022.01)

(52) U.S. Cl.
CPC .................................... *G06V 10/82* (2022.01)

(58) Field of Classification Search
CPC . G06V 10/82; G06V 10/454; G06V 30/19093
See application file for complete search history.

(56) References Cited

U.S. PATENT DOCUMENTS

| | | | |
|---|---|---|---|
| 9,633,306 B2* | 4/2017 | Liu | G06T 7/0012 |
| 11,429,865 B1* | 8/2022 | Patton | G06N 3/082 |
| 12,136,141 B2* | 11/2024 | Liu | G06T 11/00 |
| 2016/0328643 A1* | 11/2016 | Liu | G06T 7/0012 |
| 2016/0350336 A1* | 12/2016 | Checka | G06V 10/454 |
| 2018/0047159 A1* | 2/2018 | Schlegl | G06N 3/04 |
| 2018/0089530 A1* | 3/2018 | Liu | G06V 10/764 |
| 2018/0293429 A1* | 10/2018 | Wechsler | G06F 21/32 |
| 2020/0082246 A1* | 3/2020 | Shao | G06N 3/048 |
| 2020/0126263 A1* | 4/2020 | Dinh | H04N 19/136 |
| 2020/0168271 A1* | 5/2020 | Vasyltsov | G11C 11/416 |
| 2020/0372361 A1 | 11/2020 | Ehteshami Bejnordi et al. | |
| 2021/0158133 A1* | 5/2021 | Park | G06N 3/063 |
| 2021/0265016 A1* | 8/2021 | Vessere | G06V 10/764 |

(Continued)

OTHER PUBLICATIONS

Gupta, C. "Shallow Encoder Deep Decoder (SEDD) Networks for Image Encryption and Decryption" (Year: 2020).*

(Continued)

*Primary Examiner* — Mia M Thomas
(74) *Attorney, Agent, or Firm* — Foley & Lardner LLP (57) ABSTRACT

Described herein are computer-implemented systems, methods, and apparatuses for predicting classifications for image data, the system comprising a processor, memory and storage, and configured to: receive at least one image data sample; generate, using a deep neural network, for each image data sample, an activation layer comprising a set of activation vectors; perform activation vector correspondence for at least one of the activation vectors based on activation vector distance and conditioned by non-image data; and predict at least one classification for each image data sample based on the activation vector correspondence.

18 Claims, 8 Drawing Sheets

(56) References Cited

U.S. PATENT DOCUMENTS

| | | | |
|---|---|---|---|
| 2022/0058417 A1* | 2/2022 | Kazmi | G06F 18/24 |
| 2022/0067511 A1* | 3/2022 | Goldman-Shenhar | |
| | | | G06V 30/274 |
| 2022/0138481 A1* | 5/2022 | Deshpande | G06V 10/764 |
| 2022/0368349 A1* | 11/2022 | Luo | H03M 13/13 |
| 2022/0368356 A1* | 11/2022 | Luo | H03M 13/37 |
| 2023/0080133 A1* | 3/2023 | Meier | G06V 10/25 |
| | | | 382/103 |
| 2023/0353547 A1* | 11/2023 | Wang | H04L 9/14 |
| 2024/0112088 A1* | 4/2024 | Yu | G06N 3/0455 |

OTHER PUBLICATIONS

Arandjelovic, et al., "NetVLAD: CNN Architecture for Weakly Supervised Place Recognition," Proceedings of the IEEE Conference on Computer Vision and Pattern Recognition (CVPR2016), pp. 5297-5307 (2016).

Babenko, et al., "Aggregating Local Deep Features for Image Retrieval," IEEE International Conference on Computer Vision, pp. 1269-1277 (2015), 10.1109/ICCV.2015.150.

Berman, et al., "Multigrain: a unified image embedding for classes and instances," arXiv preprint arXiv:1902.05509, pp. 1-13 (2019).

Grauman, et al., "The pyramid match kernel: Efficient learning with sets of features." Journal of Machine Learning Research 8(4):725-758 (2007).

He, et al., "Spatial pyramid pooling in deep convolutional networks for visual recognition." IEEE transactions on pattern analysis and machine intelligence 37(9):1904-1916 (Sep. 2015).

Hu et al., "Squeeze-and-excitation networks," Proceedings of the IEEE conference on computer vision and pattern recognition, pp. 7132-7141 (2018) DOI 10.1109/CVPR.2018.00745.

Jaderberg et al., "Spatial transformer networks," Advances in neural information processing systems, arXiv preprint arXiv:1506.02025, pp. 1-9 (2015).

Kalantidis, et al., "Cross-dimensional weighting for aggregated deep convolutional features," European conference on computer vision, pp. 685-701 (Oct. 2016) DOI: 10.1007/978-3-319-46604-0_48.

Krizhevsky, et al., "ImageNet Classification with Deep Convolutional Neural Networks," Advances in Neural Information Processing Systems 25, 9 pp. (2012).

Lazebnik, et al., "Beyond bags of features: Spatial pyramid matching for recognizing natural scene categories," IEEE Computer Society Conference on Computer Vision and Pattern Recognition (CVPR'06), 2:2169-2178, IEEE, (2006).

LeCun et al., "Backpropagation Applied to Handwritten Zip Code Recognition", Neural Computation, 1(4):541-551 (1989).

Noh, et al., "Large-scale image retrieval with attentive deep local features," In Proceedings of the IEEE international conference on computer vision, pp. 3456-3465 (2017).

Radenovic, et al., Fine-tuning CNN image retrieval with no human annotation. IEEE transactions on pattern analysis and machine intelligence, 41(7):1655-1668 (2018).

Rumelhart, et al., "Learning representations by back-propagating errors," Nature, 323:533-536 (1986).

Sabour, et al., "Dynamic routing between capsules," arXiv preprint arXiv:1710.09829, pp. 1-11 (2017).

Vaswani, et al., "Attention is all you need," arXiv preprint arXiv:1706.03762, pp. 1-11 (2017).

Wang, et al., "Non-local neural networks," In Proceedings of the IEEE conference on computer vision and pattern recognition, pp. 7794-7803 (2018) doi 10.1109/cvpr.2018.00813.

Woo et al., "Cbam: Convolutional block attention module," In Proceedings of the European conference on computer vision (ECCV) pp. 3-19 (2018) DOI 10.1007/978-3-030-01234-2_1.

\* cited by examiner

Activation Layer Examples 1) 1D Activation Image

FIG. 1A 2) 2D Activation Image

Training Algorithm

C: Training labels

D: Contextual information

I: Activation layer

SYSTEM, METHOD AND APPARATUS FOR OBTAINING SENSITIVE AND SPECIFIC PREDICTIONS FROM DEEP NEURAL NETWORKS

CROSS-REFERENCE TO RELATED APPLICATION

This application claims the benefit of and priority to U.S. Provisional Patent Application No. 63/161,926, filed on Mar. 16, 2021, the contents of which are incorporated herein by reference in their entirety.

FIELD

The present disclosure pertains to a system, method and apparatus for obtaining predictions from deep neural networks.

BACKGROUND

Deep neural networks (DNN) are widely used to process data acquired from or destined for a presentation in space-time—specifically, where input image data is sampled over a lattice defined by 3D space and 1D time coordinates (x,y,z,t). A high correlation between data samples acquired and assembled within close proximity in 4D space-time facilitates the use of high throughput parallel computing equipment—including graphical processing units (GPUs)—for feature image extraction, where high numbers of multiply and addition (MAC) operations may be performed in parallel on data samples coming from close proximity in 4D space-time.

Some examples of deep neural networks (DNNs) include convolutional neural networks (CNN) and general transformer models, where sequential layer-wise processing alternates between a layer of linear dot product operations performed at spatio-temporal locations with a multi-channel image, and a layer of non-linear activations such as signal rectification. Processing within a single layer may generally be achieved via an arbitrarily large number of parallel computation units distributed across space-time sample points, but where all processing at a layer requires completion of processing in previous layers in order to arrive at a deterministic prediction.

Processing in a typical DNN, via architecture and training via backpropagation, is optimized to minimize the average error or loss of predicting across a fixed training set. Larger amounts of computational processing power generally afford larger networks, higher accuracy and lower error. Within deep layers of a DNN, processing power is limited by amount of filtered data that can be stored by local parallel computing units. As a result, linear filters are generally optimized to achieve minimal average error across a training set, while sacrificing information regarding specific input image samples.

For tasks requiring high specificity and sensitivity, a natural strategy would be to encode DNN activations such that they can be effectively indexed as peripheral memory filters for fine-grained predictions based on specific subsets of training examples. For efficiency and performance reasons, most approaches focus on encoding DNN layers where activations are concentrated into a small set of highly informative multi-channel vectors sampled over a minimal spatio-temporal resolution, for example spatial bottleneck layers where the resolution in one or more space-time dimensions (x,y,z,t) is greater than 1, and preceding fully connected network layers where filters of global extent collapse space-time resolution to a singular point (1×1×1×1=1).

Current memory encodings of DNN activation layers with spatio-temporal extent assume a rigid sampling structure with respect to space-time coordinates. Standard encodings include global descriptors, for example global maximum or average pooling operations, or descriptors computed from weighted linear combinations, including hierarchical descriptors. These encodings invariably mix information present at unique space-time locations within an activation layer in a manner that cannot be easily untangled or rerouted to identify concentrations of similar information at different space-time locations and across different image samples stored in memory. Non-local encodings are limited by the amount of memory on graphical processing units.

Existing DNN architectures and encodings, including ensembles, train fixed sets of filters limited to available GPU memory, and cannot be easily adapted to predict labels (denoted here by variable C) associated with specific objects, scenes or persons, particularly while conditioning on additional available pertinent non-image data (denoted here by variable D). Multiple DNNs may be trained for each condition or value of D, however this approach breaks down due to the curse of dimensionality and the need for large training sets. Network outputs may be calibrated such that they match empirical probabilities in training data, however such calibration is based on a fixed training data distribution that may not generally apply to new data contexts.

Existing DNN architectures and encodings may also have difficulty predicting labels C from individual input data acquired under specific contexts and conditions that may not have been represented in training data.

What is therefore needed is an improved system, method and apparatus for obtaining sensitive and specific predictions from deep neural networks which addresses at least some of the limitations in the prior art.

SUMMARY

The present disclosure pertains to deep machine learning of image data from trained deep neural network systems (DNN), and using such systems to automatically predict meaningful labels with instances of image data based a novel data encoding strategy.

More generally, the present disclosure provides a system, method and apparatus for optimal encoding and memory retrieval for deep neural network activation layers in the context of highly specific and sensitive image-based prediction applications. In an embodiment, the present system, method and apparatus may comprise a computer or integrated circuit for computing DNN activation layers, a memory system for storage, indexation and retrieval of activation vectors sampled at space-time points in a DNN layers along with concurrent non-image information including prediction labels C and additional pertinent non-image information D, and a computer or integrated circuit for managing the overall flow of information.

Some aspects of the present system, method and apparatus describe a generic training phase, where DNN activation vectors generated from input image data are sampled at individual space-time point locations within DNN layers and stored in memory, along with available prediction labels C and other pertinent non-image information, thus preserving instances of highly specific information for later retrieval and prediction. Prediction may then be performed by extracting DNN activation vectors at space-time point locations in a DNN layer generated from new input image, then using these to index similar activation point vectors stored in memory, thereby forming a prediction based on highly specific content shared by a new image and previous examples stored in memory.

In another aspect, there is provided a system, method and apparatus for predicting labels C conditioned on input image data and non-image information D supplied concurrently, based on activation information stored in memory. Advantageously, the present system, method and apparatus allows optimal mappings to be estimated on the fly via indexing of DNN activation vectors stored in memory, and optimal prediction to be achieved, conditional on arbitrary subsets of non-image information D.

In yet another aspect, there is provided a system, method and apparatus of enabling differential prediction from multiple image data, providing a mechanism to predict which labels C have changed between different images acquired under similar conditions as specified by non-image information D. The vector $p(I2|C,D) - p(I1|C,D)$ over possible labels C is used to represent the most likely transition of labels C between I1 and I2.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the teachings of the disclosure as a whole, for example the use of different network architectures or training algorithms. Therefore, the present system, method and apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present system, method and apparatus will be better understood, and objects of the invention will become apparent, when consideration is given to the following detailed description thereof. Such description makes reference to the annexed drawings, wherein.

DETAILED DESCRIPTION

As noted above, the present disclosure pertains to deep machine learning of image data from trained deep neural network systems (DNN), and using such systems to automatically predict meaningful labels with instances of image data based a novel data encoding strategy.

In the literature, the most closely related work pertains to machine learning via deep convolutional neural networks, transfer learning and domain adaptation to adapt these to specific new data.

Deep Neural Networks

Deep Neural Networks are widely used to solve prediction problems from multi-channel image data sampled at discrete points on a space-time lattice. The deep neural network processing algorithm follows a sequence of steps or layers defined by operations. At each layer, linear filtering is performed on image data via multiple dot product operators to form a new multi-channel image referred to as an activation map, followed by non-linear operations at space-time points including activation functions such as Sigmoid or rectification (ReLu), within space-time regions including maximum or average activation pooling, batch normalization and space-time subsampling or up-sampling. A prediction is formed at the spatio-temporal extent of interest, for example predicting global labels across the space-time extent of the image (i.e. classification) or local point-wise labels (i.e. segmentation).

Linear dot product operations are achieved via multi-channel filters that may generally operate on any subset of activation maps formed in previous algorithmic steps. Filters are multi-channel images, with numerical coefficients or weights that may be learned via a variant of the error backpropagation algorithm (Rumelhart 1986) or be specified by hand. The same filters may be used across spatio-temporal extent of the image in which case filtering is equivalent to convolution as in the convolutional neural network (CNN) (LeCun 1989, (Krizhevsky 2012), or the filters may vary according to spatio-temporal location in the image. Activation maps computed from an input image via a trained deep neural network are highly informative regarding the input image content and may be used to predict non-image labels in new image data acquired in new contexts.

As deep neural networks are typically trained to minimize the prediction error or loss averaged across a set of training image examples, prediction is suboptimal for specific individual image instances and at specific spatio-temporal locations. As deep neural networks do not explicitly encode memory, they cannot be used directly to estimate likelihood functions.

Dynamic Spatio-Temporal Routing

Linear activations in deep neural networks are achieved via multiply-and-sum operators, e.g. convolution or spatially-varying dot product based on fixed filters learned during a training phase. Activation responses are routed through sequential CNN layers implicitly via passive strategies such as Maximum or Average Pooling and Subsampling operations, or by active strategies that use fixed, learned filters to route content of a specific input image. The Capsules method (Sabour, Hinton 2017) routes convolution responses via trained filters between sequential layers in an attempt to capture spatial relationships. The non-local network (Wang 2018) computes dense dot product operations between all pairs of activations within a limited set of images. The Transformer method uses trained filters dot product attention operators to achieve routing (Vaswani 2017), dot product or element-wise product operators may be specified at individual point locations (Hu 2018, Woo 2018). The Spatial Transformer method (Jaderberg 2017) seeks a linear transform spatially deforming coordinates of convolution responses coordinates from early CNN layers. (Behnordi and Welling 2020) propose a channel gating strategy to dynamically select a subset of filters relevant to the current input to pass to subsequent layers.

All existing strategies are limited to the interaction between fixed filters and an input image, none reroute activations based on a dynamically varying memory. All existing strategies require network filter retraining in order to adapt prediction to pertinent records in memory or subsets of memory specified by conditional non-image information, which is generally prohibitive due to continual arrival or new data and large space of conditions. All computational DNN strategies adopt the dot production operation between filters and image, i.e. multiplication-and-sum, including transformers and single-pixel attention operators, primarily for use with limited sets of filters and data on graphics processing units (GPUs).

Memory-Based Learning

Memory-based learning, also known as lazy learning, instance-based learning, is a method used to predict labels from image data by storing image feature codes, labels and other non-image information in memory. Prediction for a new image is performed by encoding the new image, indexing the memory for K nearest neighbor codes with minimum distance to the new image code and forming a weighted sum for each label based on nearest neighbor codes, where the labels with the highest weighted sum are deemed the most probable, for example kernel density estimates. Memory-based learning requires no explicit training procedure, may be estimated on-the-fly, may be conditioned on arbitrary subsets of memory based on non-image information, may be adapted to predicting arbitrary labels, and may be used to estimate the posterior conditional probability, converging to a small percentage of Bayes optimal error rate (Coverand-Hart1967). CNN layers, particularly the final spatial bottleneck layer, contain large amounts of information and thus are the focus of various encodings for memory-based indexing. Various layer encodings have been proposed, typically for retrieval of images of specific landmark scenes, these include global descriptors (Arandjelovic2016), weighted averaging or maximum pooling of activations (Radenović2018)(Noh2017), layer aggregation (Babenko 2015, Kalantidis 2016), additional neural network training and fine-tuning structures (Berman2019) including data whitening and compression via principal component analysis, hierarchical structures with local-to-global pooling from shallow features and (Lazebnik 2006, Grauman 2007) deep CNN features such as the spatial pyramid (He 2015).

All of these encodings assume a rigid, fixed spatial image structure prior to feature encoding, and require training to adapt to new data. They do not make use of activation vectors at individual point vectors in activation images, where activation vectors are highly informative but poorly localised in space. By combining different activation vectors from the same activation layer into descriptors, they are unable to pool activation vector information located at different space-time locations across different image examples in a memory.

Method

Figure 4:
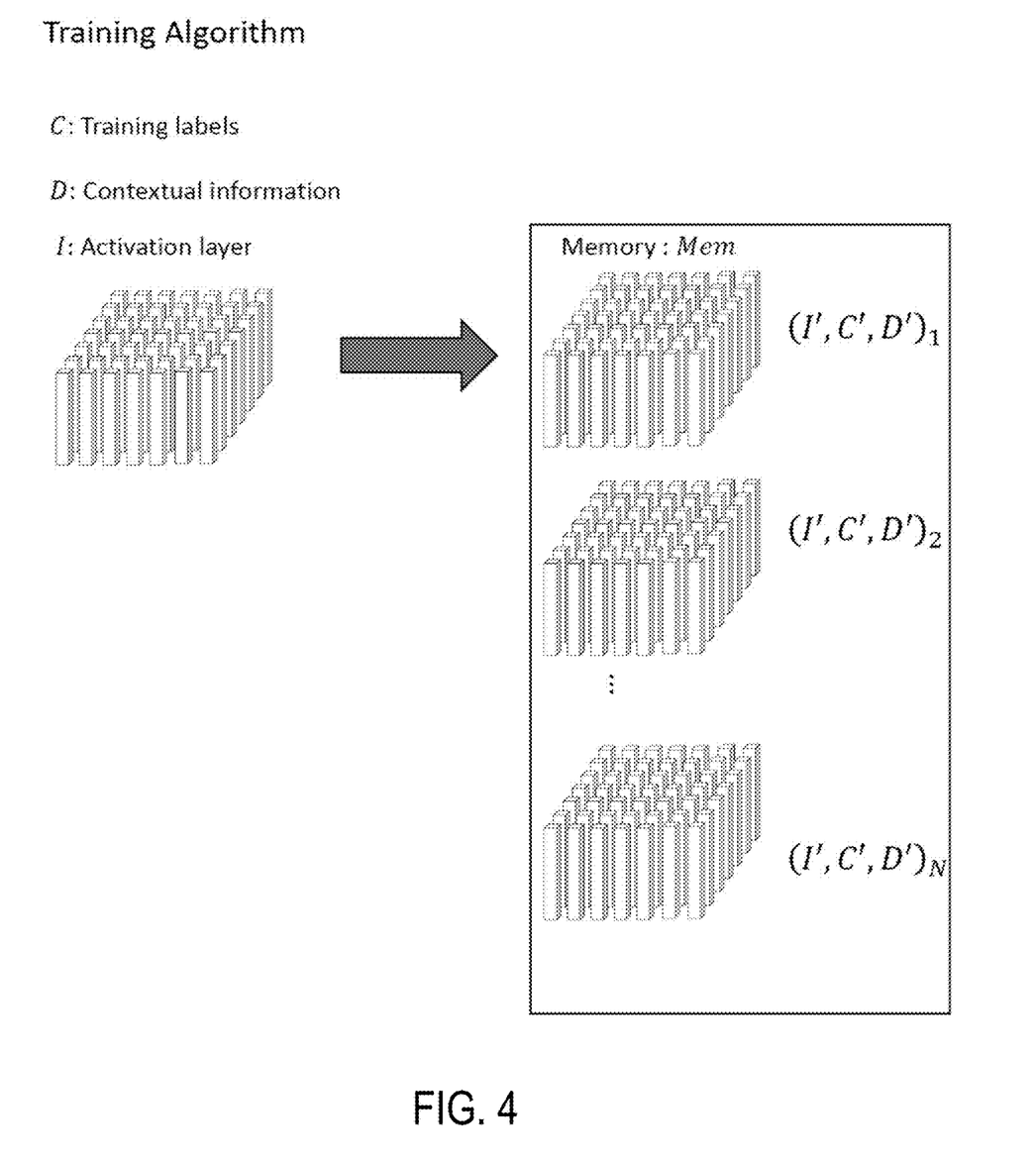
FIG. 4 illustrates a process of training including DNN activation vector extraction and storage.

It may be important to associate activations resulting from the same filtering operations applied to different input images. For example, to estimate the likelihood of a class C associated with a set of activations I derived from an input image, given a subset $\{I_1, \ldots I_N\}$ of relevant activations stored in a memory as defined by pertinent non-image contextual information as shown in FIG. 4 and FIG. 5.

Figure 2:
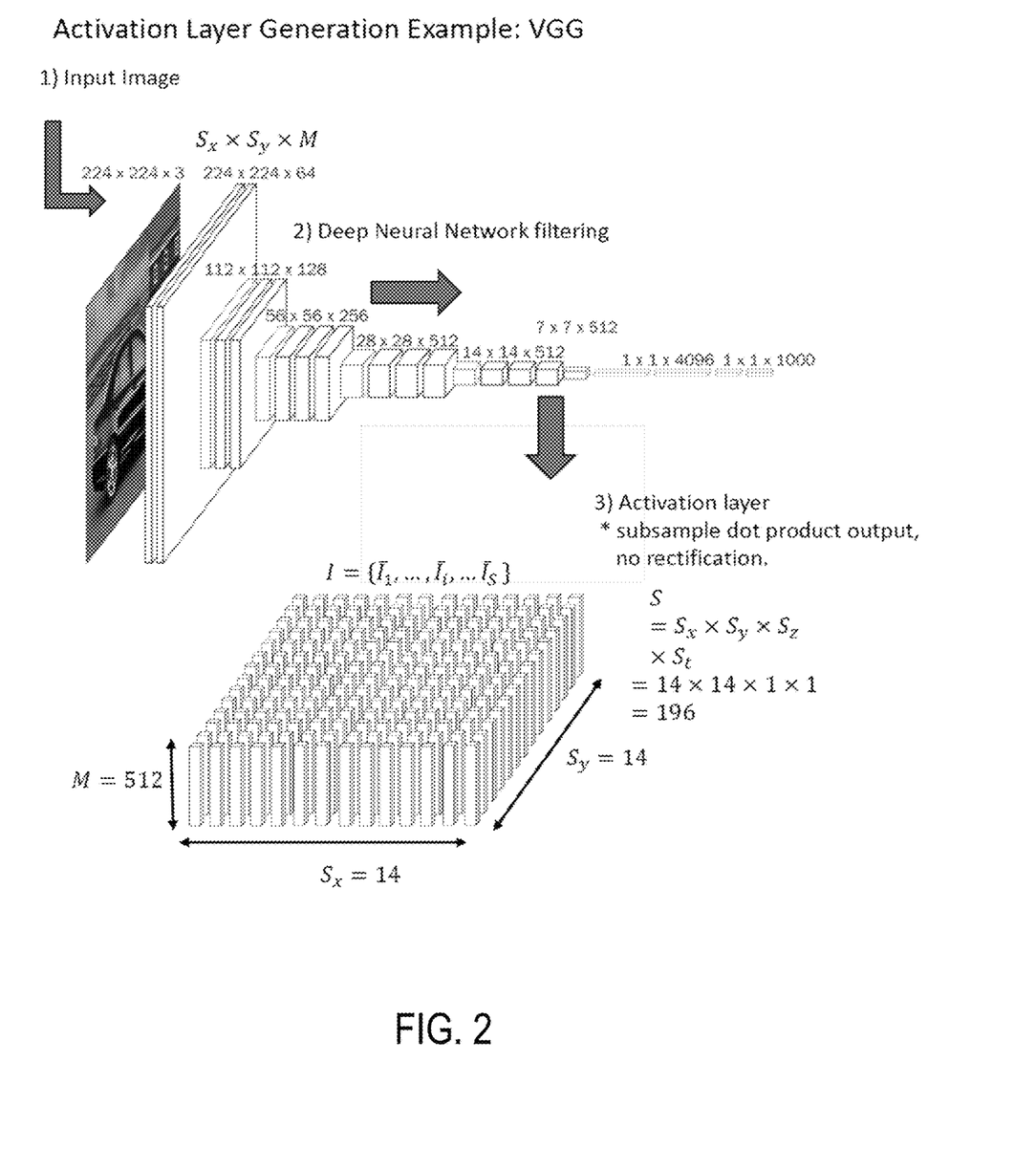
FIG. 2 illustrates an example embodiment of a deep neural network prediction architecture that may be used with the present system, method and apparatus, showing an illustrative DNN activation layer from which the present method could be used.
Figure 3:
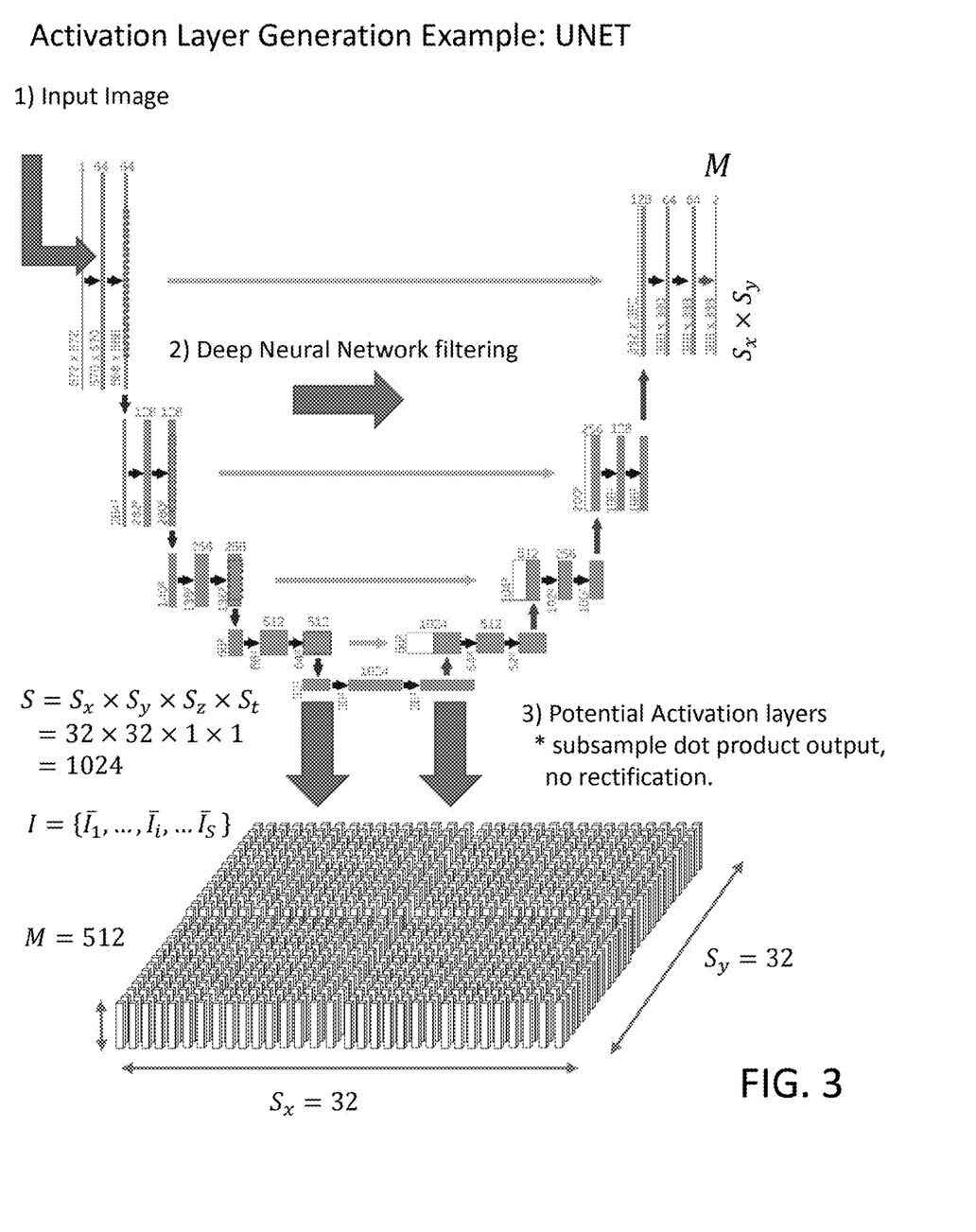
FIG. 3 illustrates an example embodiment of a deep neural network segmentation architecture that may be used with the present system, method and apparatus, showing typical DNN activation layers from which the present method could be used.

This may be particularly true for spatial bottleneck layers where the number of activation samples is reduced to small set of space-time points resulting from dot product operations as shown in FIG. 2 and FIG. 3, and prior to subsequent operations including point-wise operations such as such as non-linear sigmoid or rectification (ReLu), batch normalization or spatially global operations such as maximum pooling (MaxPooling), subsampling or linear combinations where space-time is reduced to a single point.

Figure 5:
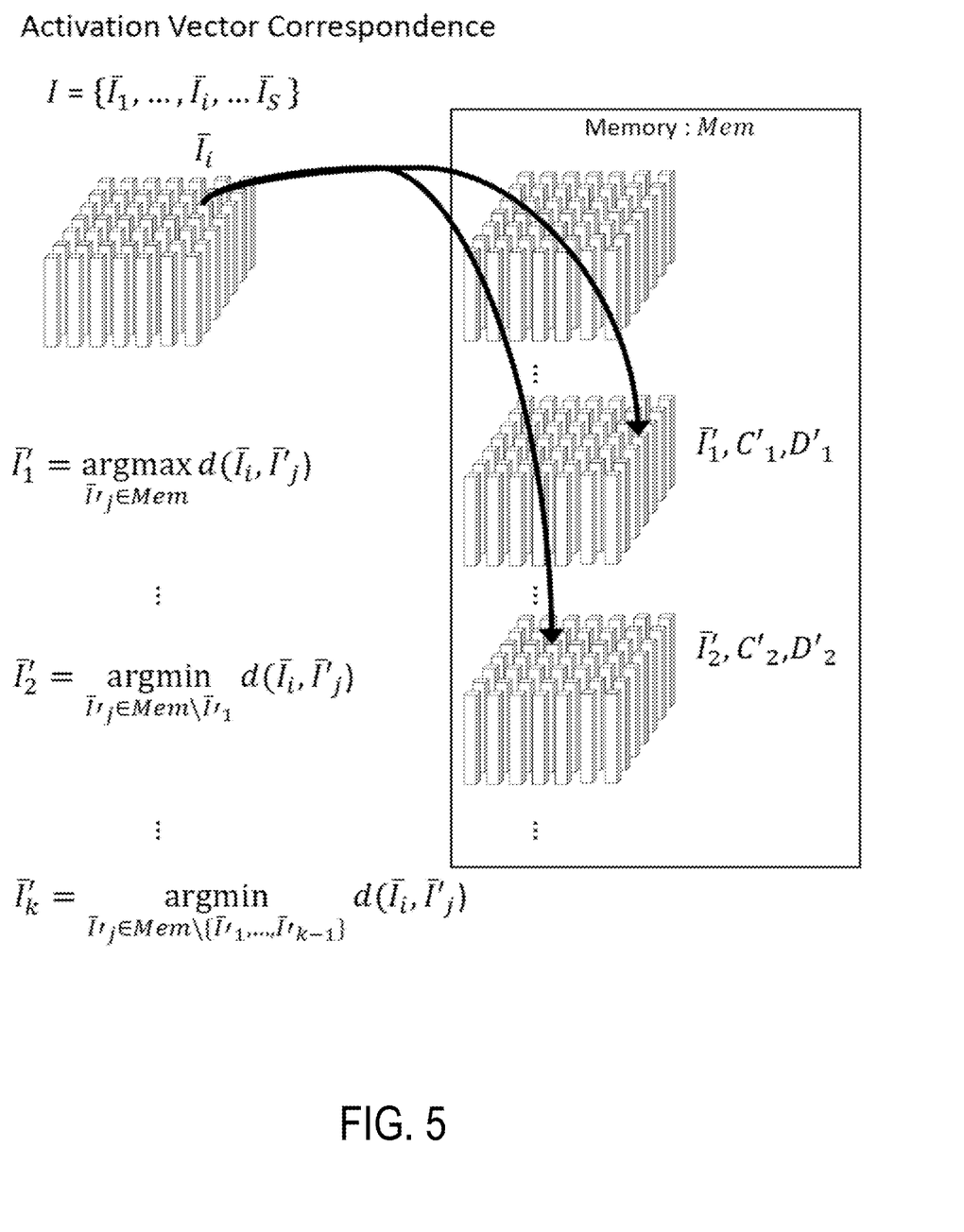
FIG. 5 illustrates a process of correspondence between DNN activation vectors extracted at different space-time points from different input images, according to minimum distance criterion, as opposed to dot product operations.

An activation image may be compared a memory of activation images generated from other image data, and used to achieve correspondence between activation vectors for which the image-to-image difference or distance is minimal as shown in FIG. 5, where the distance may be generally defined for example by the Euclidean distance, Mahalanobis distance, or where the image-to-image affinity is maximal. This avoids the need for dot product operations or cosine distance used in linear filtering, which generally require normalization, and allows prediction from an arbitrarily large memory structure of previous examples.

Figure 7:
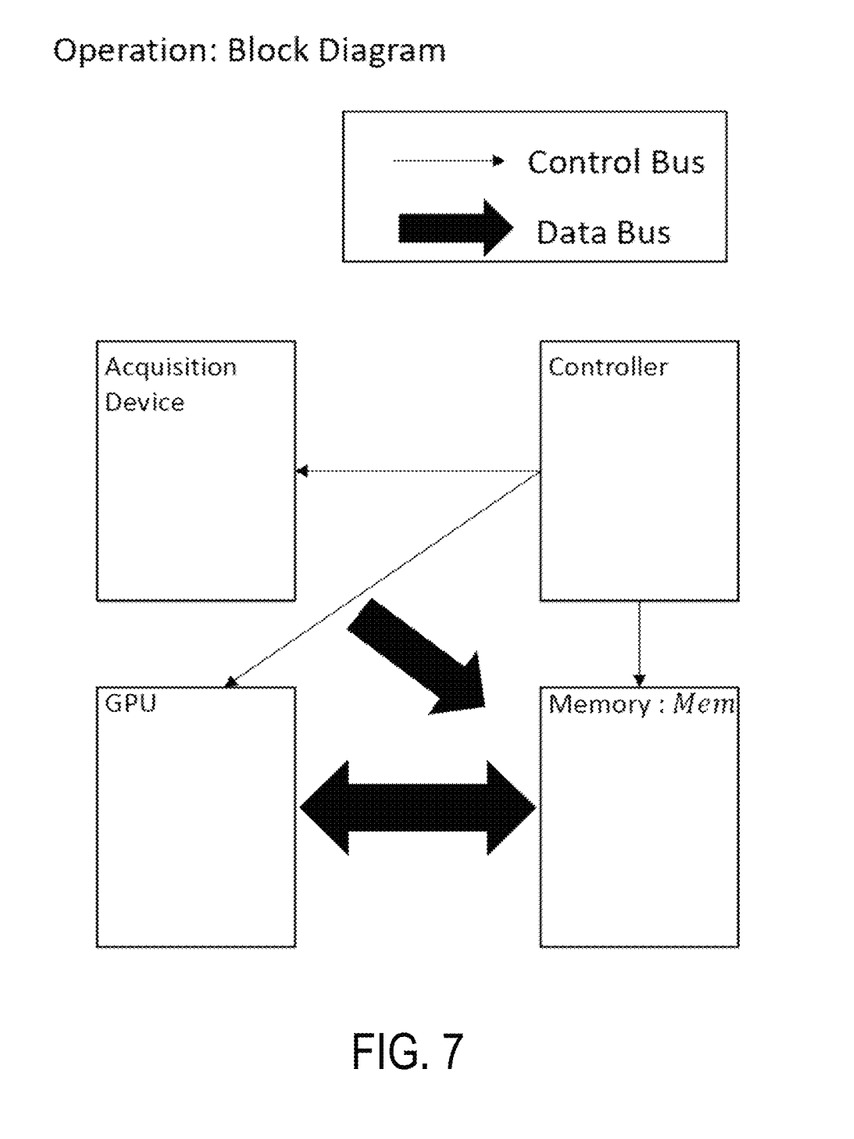
FIG. 7 illustrates a block diagram representing various physical system components including image acquisition apparatus, DNN computation apparatus, interface to memory apparatus and control apparatus.

However, the most relevant information within a single activation image I may be localized at individual spatiotemporal (x,y,z,t) coordinate locations or points, and may distributed across different coordinate locations in sets of activation images stored in memory $\{I'_1, \ldots I'_N\}$. In an exemplary method according to the present invention, each data vector $\bar{I}_i \in I$ associated with a point location in an activation image I is paired with a set of nearest neighbor vectors $\{\bar{I}_j\}$ from a set of activation images $\{I'_1, \ldots I'_N\}$ stored in memory, where the nearness or proximity of a pair of vectors is defined by distance function $d(\bar{I}_i, \bar{I}'_j)$ conditional on non-image information D. This pairing may be achieved via a generic indexing method such as a KD-tree lookup or locality-sensitive hashing, including memories distributed across computational servers as in FIG. 7.

Definitions

Space-time is defined as: a space defined by the three dimensions of Euclidean (x,y,z) space and the one dimensional time axis t.

A point is defined as: a (x,y,z,t) coordinate location in a space-time, or a subset of a space-time. For example a point (x,y) in a two dimensional photograph, or a coordinate location (x,y,t) in a video.

A data value is defined as: a set of numerical values at a point, including a scalar number, a multi-valued vector array, a multi-dimensional tensor, for example a multi-channel red-green-blue pixel value in a photograph.

A data sample is defined as: a data value at a point, for example a multi-channel value sampled with a lattice of point locations over space-time (x,y,z,t), where multi-channel linear dot product operators computed between two or more multi-channel images in a layerwise-fashion, possibly interleaved with other non-linear operators in a hierarchical fashion. May be sampled within the same space-time reference frame. Thus for notational purposes space-time (x,y,z,t) is indexed via generic space-time indices i and j.

An image I is defined as: a collection of data samples where points are arranged according a space-time lattice.

An input image is defined as: an image where data samples are acquired from a sensory apparatus, including but not limited to multi-channel a digital camera, hyperspectral imaging device, microphone array, magnetic resonance imaging device, ultrasonic sensor, x-ray modalities.

Examples included but are not limited to a color photograph, a stereo sound wave, a video, a volumetric magnetic resonance image.

A filter is defined as: a multi-channel image where data samples are the coefficients used in linear dot-product operations. Filter values may be specified manually or derived from training algorithms including error gradient back-propagation based on labeled image data examples (Rumelhart 1986).

An activation is defined as: the data value of a dot-product operation between a multi-channel filter and a multi-channel image at a point location.

An activation vector is defined as: a vector of activations resulting from multiple dot product operations between multiple multi-channel linear filters and a multi-channel image at a point location.

An activation image or activation layer is defined as: an image where the data value at each point is an activation vector produced from multiple dot product operations between a multi-channel linear filter and one or more preceding layers in sequential DNN processing. Examples include one or more layers within a deep neural network, including but not limited to: common network architectures including CNNs (e.g. Densenet, Resnet, Inception, Mobilenet, VGG, Long Short Term Memory, YOLO, RCNN and variants), dot product networks (Transformer), implementations in software coding libraries (TensorFlow, PyTorch) and in alternative physical technologies including field programmable gate arrays (FPGA), application specific integrated circuits (ASIC) derived from silicon-based transistors.

Non-image information is defined as: numerical values for variables regarding the content associated with image data, including information that is generally unknown for an input image (referred to as training label C in FIG. 4) and information that is generally known for an input image (referred to as D in FIG. 5).

With reference to the Figures, illustrative embodiments will now be described in more detail.

Figure 1A:
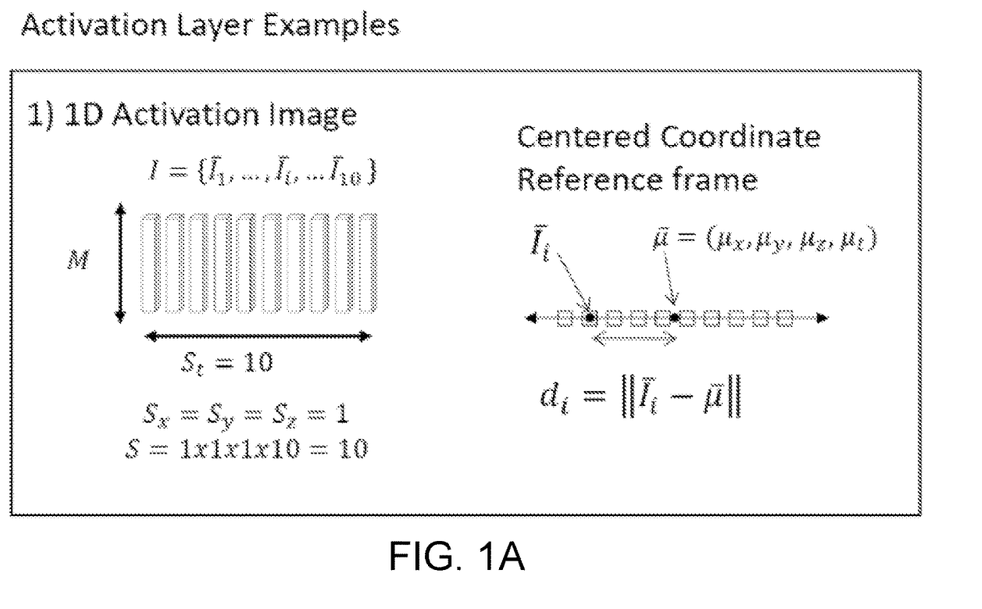
FIG. 1A and FIG. 1B show two illustrative embodiments of the present system, method and apparatus, including a 1D activation image with extent in the time dimension and a 2D activation image example with extent in 2D space.
Figure 1B:
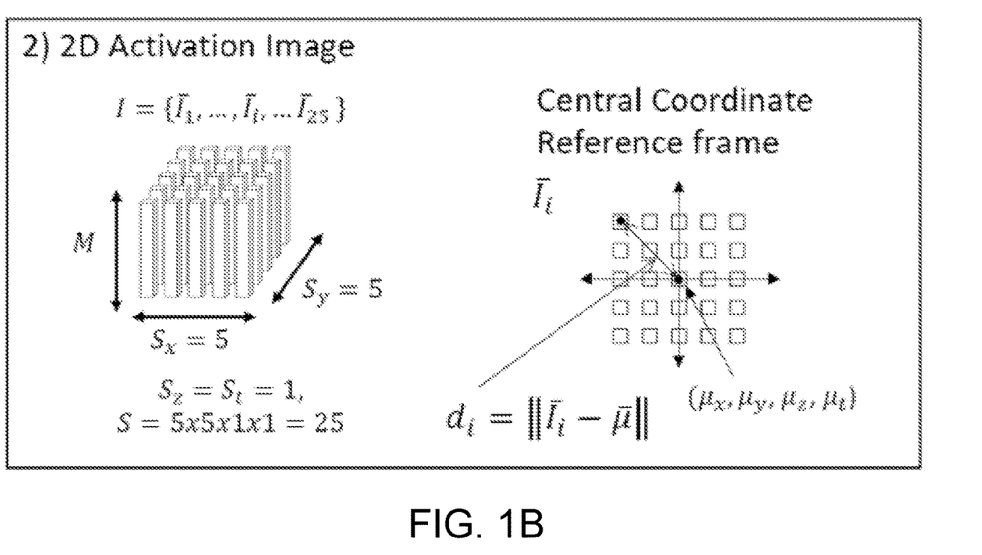

FIG. 1A and FIG. 1B show two examples of illustrative embodiments of various embodiments of the present system, method and apparatus, 1D activation image with extent in the time dimension and a 2D activation image example with extent in 2D space.

Let $(S_x, S_y, S_z, S_t)$ represent the spatio-temporal resolution of an activation layer in the four (x,y,z,t) space-time dimensions, where the resolution in each dimension is equal to or greater than 1, i.e. $1 \leq S_x, S_y, S_z, S_t$.

Let $S = S_x \times S_y \times S_z \times S_t$ represent number of activation vectors in a layer.

Let (x, y, z, t) represent the coordinate location of a point within an activation layer in the four space time dimensions. The coordinate location may be expressed with respect to a central reference frame with an origin centered within the image. For brevity of exposition, point locations may also be represented using point indices i and j where locations (x, y, z, t) are unnecessary.

Let $I = \{\bar{I}_1, \ldots \bar{I}_i, \ldots \bar{I}_S\}$ represent an activation layer associated with an input image generated via a DNN, where $\bar{I}_i$ represents an activation vector at point index i.

Let M represent the number of channels in an activation layer.

In an embodiment, activation images may be generated from a generic DNN architectures, including DNNs trained to perform tasks such as prediction, classification, such as the generic VGG network shown in FIG. 2. Here, an input image, such as a color photograph, may be processed by a DNN (here a generic VGG network), including sequential, layer-wise DNN operations including linear filtering and non-linear operations such as rectification. 3) An activation layer $I = \{\bar{I}_1, \ldots \bar{I}_i, \ldots \bar{I}_S\}$ resulting from the linear dot product filtering of a previous layer, here a convolution layer defined at a spatio-temporal resolution of $S_x \times S_y = 14 \times 14$ for a total of $14 \times 14 = 196$ activation vectors.

In another embodiment, activation images may be generated from a generic DNN architectures, including DNNs trained to perform tasks such as image segmentation, such as the generic UNET network shown in FIG. 3. In this example, an input image (such as a color photograph) may be processed by a DNN (here a generic VGG network), including sequential, layer-wise DNN operations including linear filtering and non-linear operations such as rectification. An activation layer $I = \{\bar{I}_1, \ldots \bar{I}_i, \ldots \bar{I}_S\}$ resulting from the linear dot product filtering of a previous layer, here a convolution layer defined at a spatio-temporal resolution of $S_x \times S_y = 14 \times 14$ for a total of $14 \times 14 = 196$ activation vectors.

Now referring to FIG. 4, prior to prediction, a training algorithm is first employed to store activation images generated from a set of training input images coupled with non-image image information in memory.

Let C represent labels of interest associated an individual image. These may be defined by numerical values and are generally available and associated with training images. They are not available and unknown during prediction based on a query input image.

Let D represent pertinent non-image contextual information generally provided with all training and query images, both for training and during prediction.

Training input images are first captured via an acquisition device, where each image is associated with non-image labels C and contextual information D. For each training image, a record (I,C,D) is generated, including an activation layer I generated from a DNN, non-image data label C and additional pertinent non-image information D.

Each record (I,C,D) is stored in a memory M that may be indexed by individual activation vectors $\bar{I}_i$. Records stored in memory are referred to as (I', C', D'), where (I', C', D')$_n$ represents the record number n.

Now referring to FIG. 5, in an embodiment, the present system, method and apparatus are adapted to predict labels C from activation vectors $I = \{\bar{I}_1, \ldots \bar{I}_i, \ldots \bar{I}_S\}$ extracted in a new input image highly based on specific activation vector information stored in memory. This is achieved via an activation vector correspondence process whereby a vector $\bar{I}_i \in I$ from an input image is used to index a set of K nearest neighbor activation vectors $\bar{I}_j' \in \bar{I} \in M$ stored in memory that minimize a pairwise distance measure $d(\bar{I}_i, \bar{I}_j)$. The distance measure and indexing methods used may vary and are discussed later.

FIG. 5 illustrates the key novel insight of the present system, method and apparatus via an example where a query activation vector $\bar{I}_i$ is used to index a set of k=2 nearest neighbors $NN_i = \{\bar{I}_1 \ \bar{I}_2\}$ stored in memory and associated with label and non-image information $(C_1', D_1'), (C_2', D_2')$.

Nearest neighbors represent the activation vectors in memory that are the most similar to the query vector $\bar{I}_i$, and thus the most informative samples upon which prediction may be based.

In general, nearest neighbor activation vectors are located at different space-time locations in different activation layers, particularly for highly similar image instances not used in DNN training. Because existing DNN prediction and encoding methods assume a fixed spatial layout in activation layers and group multiple activation vectors into global features and encodings for each image, or consider dense correspondences vectors within a limited set of images or vectors in a GPU, they are unable to make use of the most highly specific activation vector information scattered at sparse locations across space-time and all memory.

The pairwise distance measure $d(\bar{I}_i, \bar{I}_j)$ between $\bar{I}_i$ and $\bar{I}_j$ is defined as $$d(I_i, I_j) = [I_i - I_j']^T \Sigma_{ij}^{-1} [I_i - I_j']$$

where $[\bar{I}_i - \bar{I}_j']$ is the vector difference between $\bar{I}$ and $\bar{I}_j'$, $[\bar{I}_i - \bar{I}_j']^T$ is the transpose of $[\bar{I}_i - \bar{I}_j']$, and $\Sigma_{ij}$ is a symmetric positive semi-definite covariance matrix with inverse $\Sigma_{ij}^{-1}$ that accounts for the metric structure of the activation space from which $\bar{I}_i$ and $\bar{I}_j'$ are sampled. Covariance matrix $\Sigma_{ij}$ may be defined as an identity matrix in which case $d(\bar{I}_i, \bar{I}_j')$ is the Euclidean distance, a diagonal matrix with one negative element in the case of the Minkowski metric, or a general covariance matrix or metric tensor in which case $d(\bar{I}_i, \bar{I}_j')$ is the Mahalanobis distance. Appropriate methods may be used to compress activation vector information $\bar{I}_i \in I$ for the sake of efficiency without affecting the method, for example the Fourier transform or principal component analysis (PCA).

The distance may be generalized to include activation vector space-time coordinates $(x_i, y_i, z_i, t_i)$ associated with $\bar{I}_i$. For example, activation vectors in the center of the layer tend to be highly sensitive to training class labels C, and become increasingly specific towards the periphery.

Individual activation vectors may be modulated according to their displacement with respect to their current position or with respect to a central coordinate $(x_\mu, y_\mu, z_\mu, t_\mu)$ of the activation layer as shown in examples in FIG. 1A and FIG. 1B, where displacement for activation vector $I_i$ is defined as $$d_i = \|(x_i, y_i, z_i, t_i) - (x_\mu, y_\mu, z_\mu, t_\mu)\|,$$

The distance may also be generalized to include the difference between space-time coordinates $(x_i, y_i, z_i, t_i)$ associated with activation vector $\bar{I}_i$ and coordinates $(x_j, y_j, z_j, t_j)$ associated with corresponding activation vector $\bar{I}_j'$, since corresponding activation vectors for similar image content tend to be identified at the same space-time coordinates. This distance may be defined as:

$$d_{ij} = \|(x_i, y_i, z_i, t_i) - (x_j, y_j, z_j, t_j)\|,$$

where the minimum displacement may be evaluated considering wrapping at the borders for image, i.e., such that points on opposite sides of the image are adjacent to one another.

Figure 6:
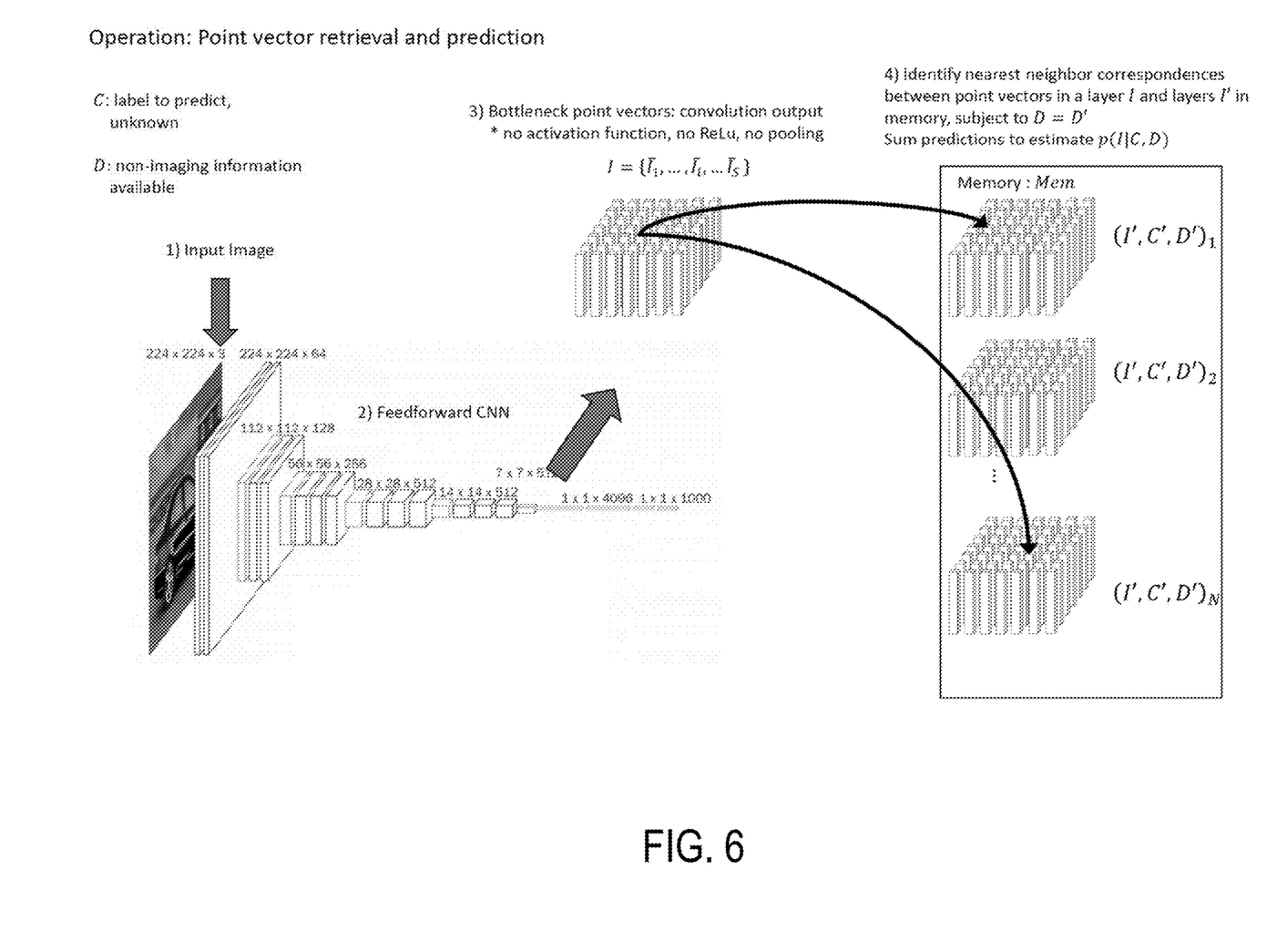
FIG. 6 illustrates a process of prediction based on DNN activation vectors extracted from a new input image.

Now referring to FIG. 6, the activation vector correspondence procedure identifies highly informative links from an input image to image and non-image data stored in memory, which may be used to predict labels associated with the input image.

The input to prediction is a data record (I,D) consisting of an activation layer I generated from the input image via a DNN, along with pertinent non-image information D upon which prediction may be conditioned. Standard DNN prediction methods are generally unable to condition responses directly upon non-image data D, for example to estimate a likelihood function p(I|C, D) over the range of possible values of C given a subset of training data defined by D. These and memory-based learning methods using standard DNN layer encodings assuming a fixed spatio-temporal arrangement of activation vectors within a layer are unable to leverage highly specific activation vector information located at different spatio-temporal points across activation vectors extracted from different images.

A variety of prediction strategies may be adapted based on activation vector correspondence, including but not limited to the following strategy.

First, for each activation $\bar{I}_i \in I$, a set of k nearest neighbor activations $NN_i = \{I_1', \ldots I_k'\}$ is identified in memory via activation vector correspondence as shown in FIG. 5, where k is a design parameter, and nearest neighbor set $NN_i$ is defined as $$NN_i = \{\bar{I}_j' : d(\bar{I}_i, \bar{I}_j') \leq d(\bar{I}_i, \bar{I}_k') \wedge d = D'\}$$

where $d(\bar{I}_i, \bar{I}_k')$ is the distance to the $k^{th}$ nearest neighbor $I_k' \in M$ in memory defined as $$\bar{I}_k' = \operatorname*{argmin}_{\bar{I}_j \in M \setminus \{\bar{I}_1', \ldots \bar{I}_{k-1}'\}} d(\bar{I}_i, \bar{I}_j),$$

i.e., the nearest vector in memory to $\bar{I}_i$ excluding the k—1 nearest neighbors. Nearest neighbor indexing may be implement efficiently via standard indexing algorithms such as KD-trees or locality sensitive hashing.

Second, the likelihood p(I|C,D) function may then be estimated over possible labels C from activation layer I and non-image information D. For example, via the following radio of sums:

$$p(I|C, D) \propto \frac{\sum_i \sum_{\bar{I}_j \in Mem} [C = C_j'][D = D_j'] e^{-\lambda_1 d^2(\bar{I}_i, \bar{I}_j') - \lambda_2 d_i^2 - \lambda_3 d_{ij}^2}}{\sum_i \sum_{\bar{I}_j \in Mem} [C = C_j'][D = D_j']} \approx$$

$$\frac{\sum_i \sum_{\bar{I}_j \in NN_i} [C = C_j'][D = D_j'] e^{-\lambda d^2(\bar{I}_i, \bar{I}_j') - \lambda_2 d_i^2 - \lambda_3 d_{ij}^2}}{\sum_i \sum_{\bar{I}_j \in NN_i} [C = C_j'][D = D_j']}$$

where $[C=C_j']$ and $[D=D_j']$ are the Iverson brackets evaluating to 1 upon equality and 0 otherwise. Here $\lambda_1$, $\lambda_2$ and $\lambda_3$ are positive constants for adjusting kernel bandwidth, note that these represent data variance, may generally be derived from training procedures and/or replaced by a suitable inverted covariance matrix, i.e. in the case of the Mahalanobis distance measure accounting for class and condition-specific covariance between activation vector values and positions. Following estimation of the likelihood function, prediction may be performed by identifying a maximum likelihood label $C^{ML}$ defined as $$C^{ML} = \operatorname*{argmax}_{C} p(I | C, D)$$

Differential Prediction

It may be difficult to achieve prediction from a single input image, due to domain bias where the acquisition conditions for input image are significantly different from training data.

In some instances it may be useful to achieve a differential prediction based activation layers $I_1$ and $I_2$ generated from two or more pertinent input images, where the goal not to determine absolution prediction of C but whether the labels C have changed between activations $I_1$ and $I_2$. This may be achieved by estimating the likelihood functions $p(I_1|C, D_1)$ and $p(I_2|C, D_2)$ of C from activation layers $I_1$ and $I_2$ and respective associated non-image information $D_1$ and $D_2$. This will provide two estimates of likelihood functions of C, possibly each exhibiting significant domain bias. Assuming both are affected by similar additive bias, and a likelihood difference test may be used. The magnitude of the likelihood difference may be used to identify the class $C^\Delta$ most likely to have changed between $I_1$ and $I_2$ $$C^\Delta = \underset{C}{\operatorname{argmax}} |p(I_1 \mid C, D_1) - p(I_2 \mid C, D_2)|$$

where the sign of the difference $p(I_1|C^\Delta, D_1) - p(I_2|C^\Delta, D_2)$ indicates in what direction the changed, i.e. whether likelihood of $C^\Delta$ has increased or decreased between $I_1$ and $I_2$.

Individual Activation Vector encoding: Individual activation vectors may be encoded via a number of means to improve the computational efficiency and reduce the activation vector footprint for correspondence, for example principal component analysis, linear discriminant analysis.

Alternative layers: The method may be applied to layers other than activation layers formed via dot product operators, however at the cost of reduced accuracy.

Multiple layers: The method may be applied simultaneously or in series with a plurality of different CNN layers and multiple independent networks, which may improve accuracy at the cost of increased computation and storage requirements. In particular, layers with higher space-time resolution may generally afford higher accuracy.

Region-of-interest: The method may be applied to activation vectors within localized regions or subsets of space-time within an input image or arbitrary activation layer, in order to focus on a specific region of interest.

Distributed memory: Activation vector correspondence may be achieved via distributed memory systems in order to increase the number of available activation samples in memory improve performance.

Augmented samples: The method may be applied to multiple activation layers generated from the same input image to improve prediction, via the process of data augmentation, whereby the input image is repeatedly transformed by random variations in geometry and appearance. New activation layers are then generated from these transformed images, and these activation layers may be stored as additional examples in an augmented memory for search.

Reduced samples: The method may be applied by subsampling activation vectors within an activation layer to improve efficiency, for example uniformly subsampling vectors, including local pooling operations, however at the cost of reduced accuracy.

Figure 8:
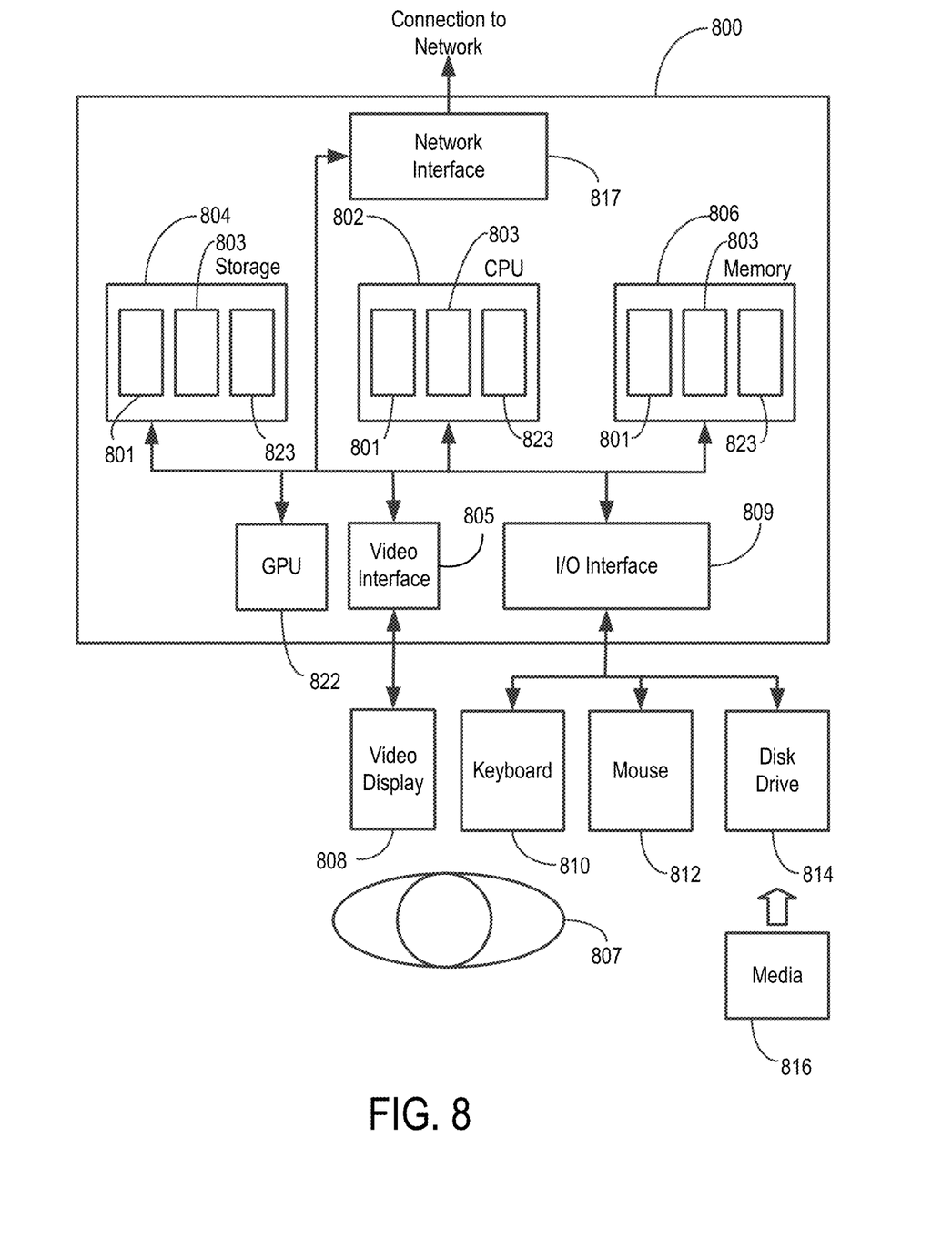
FIG. 8 shows a schematic block diagram of a computing device which may provide an operating environment in accordance with an embodiment.

Now referring to FIG. 8 shown is a schematic block diagram of a computing device that may provide a suitable operating environment in one or more embodiments. A suitably configured computer device, and associated communications networks, devices, software and firmware may provide a platform for enabling one or more embodiments as described above. By way of example, FIG. 8 shows a computer device 800 that may include a central processing unit ("CPU") 802 connected to a storage unit 804 and to a random access memory 806. The CPU 802 may process an operating system 801, application program 803, and data 823. The operating system 801, application program 803, and data 823 may be stored in storage unit 504 and loaded into memory 806, as may be required. Computer device 800 may further include a graphics processing unit (GPU) 822 which is operatively connected to CPU 802 and to memory 806 to offload intensive image processing calculations from CPU 802 and run these calculations in parallel with CPU 802.

An operator 810 may interact with the computer device 800 using a video display 808 connected by a video interface 805, and various input/output devices such as a keyboard 810, pointer 812, and storage 814 connected by an I/O interface 809. In known manner, the pointer 812 may be configured to control movement of a cursor or pointer icon in the video display 808, and to operate various graphical user interface (GUI) controls appearing in the video display 808. The computer device 800 may form part of a network via a network interface 811, allowing the computer device 800 to communicate with other suitably configured data processing systems or circuits. A non-transitory medium 816 may be used to store executable code embodying one or more embodiments of the present method on the computing device 800.

While illustrative embodiments have been described above by way of example, it will be appreciated that various changes and modifications may be made without departing from the scope of the invention, which is defined by the following claims.

A specific embodiment will now be described. In some embodiments, the present disclosure relates to a novel system, method and apparatus for encoding activations generated by a generic deep neural network from an image that can be used in conjunction with memory storage devices for highly sensitive and specific prediction of labels associated images of general objects, scenes or persons. The method and apparatus may involve the use of a processor circuit, for example an application server, for automatically predicting a plurality of labels (e.g., diagnostic indices) from an input image and non-image descriptive information associated with the image, where non-image information may include general descriptors of image content (e.g., ear, chest, skin, face), acquisition modality (e.g., hyperspectral image, magnetic resonance image, x-ray, computed tomography, ultrasound, acquisition parameters) and specific descriptors (e.g., unique name or ID, sex, ethnicity, age, date, disease status). A plurality of image feature vectors are extracted from the spatial bottleneck layer from one or more trained convolutional neural networks. Features are stored in memory along with non-image descriptive data. Features extracted from a new image are matched to features stored in memory based on feature-to-feature distance and constrained by non-image information, in order to predict unknown labels. Where features extracted from images of a specific object, scene or person have been previously stored in memory, features extracted from a new image may be used to form a differential prediction based on previous data.

REFERENCES

Arandjelovic, R., Gronat, P., Torii, A., Pajdla, T. and Sivic, J., 2016. NetVLAD: CNN architecture for weakly supervised place recognition. In Proceedings of the IEEE conference on computer vision and pattern recognition (pp. 5297-5307).

Babak Ehteshami Behnordi, Tijmen Pieter, Frederik Blankevoort, Max Welling. "CHANNEL GATING FORCONDITIONAL COMPUTATION", Pub. No.: US2020/0372361, 2020

Babenko, A. and Lempitsky, V., 2015. Aggregating local deep features for image retrieval. In Proceedings of the IEEE international conference on computer vision (pp. 1269-1277).

Berman, Maxim, Hervé Jégou, Andrea Vedaldi, Iasonas Kokkinos, and Matthijs Douze. "Multigrain: a unified image embedding for classes and instances." arXiv preprint arXiv:1902.05509 (2019).

Grauman, Kristen, and Trevor Darrell. "The pyramid match kernel: Efficient learning with sets of features." Journal of Machine Learning Research 8, no. 4 (2007).

He, Kaiming, Xiangyu Zhang, Shaoqing Ren, and Jian Sun. "Spatial pyramid pooling in deep convolutional networks for visual recognition." IEEE transactions on pattern analysis and machine intelligence 37, no. 9 (2015): 1904-1916.

Hu, J., Shen, L. and Sun, G., 2018. Squeeze-and-excitation networks. In Proceedings of the IEEE conference on computer vision and pattern recognition (pp. 7132-7141).

Jaderberg, M., Simonyan, K., Zisserman, A. and Kavukcuoglu, K., 2015. Spatial transformer networks. arXiv preprint arXiv:1506.02025.

Kalantidis, Y., Mellina, C. and Osindero, S., 2016, October. Cross-dimensional weighting for aggregated deep convolutional features. In European conference on computer vision (pp. 685-701). Springer, Cham.

Krizhevsky, A., Sutskever, I. and Hinton, G. E., 2012. Imagenet classification with deep convolutional neural networks. Advances in neural information processing systems, 25, pp. 1097-1105.

Lazebnik, Svetlana, Cordelia Schmid, and Jean Ponce. "Beyond bags of features: Spatial pyramid matching for recognizing natural scene categories." In 2006 IEEE Computer Society Conference on Computer Vision and Pattern Recognition (CVPR'06), vol. 2, pp. 2169-2178. IEEE, 2006.

LeCun, Y., Boser, B., Denker, J. S., Henderson, D., Howard, R. E., Hubbard, W. and Jackel, L. D., 1989. Backpropagation applied to handwritten zip code recognition. Neural computation, 1(4), pp. 541-551.

Noh, H., Araujo, A., Sim, J., Weyand, T. and Han, B., 2017. Large-scale image retrieval with attentive deep local features. In Proceedings of the IEEE international conference on computer vision (pp. 3456-3465).

Radenović, F., Tolias, G. and Chum, O., 2018. Fine-tuning CNN image retrieval with no human annotation. IEEE transactions on pattern analysis and machine intelligence, 41(7), pp. 1655-1668.

Rumelhart, D. E., Hinton, G. E. and Williams, R. J., 1986. Learning representations by back-propagating errors. nature, 323(6088), pp. 533-536.

Sabour, Sara, Nicholas Frosst, and Geoffrey E. Hinton. "Dynamic routing between capsules." arXiv preprint arXiv:1710.09829 (2017).

Vaswani, Ashish, Noam Shazeer, Niki Parmar, Jakob Uszkoreit, Llion Jones, Aidan N. Gomez, Lukasz Kaiser, and Illia Polosukhin. "Attention is all you need." arXiv preprint arXiv:1706.03762 (2017).

Woo, S., Park, J., Lee, J. Y. and Kweon, I. S., 2018. Cbam: Convolutional block attention module. In Proceedings of the European conference on computer vision (ECCV) (pp. 3-19).

Wang, Xiaolong, Ross Girshick, Abhinav Gupta, and Kaiming He. "Non-local neural networks." In Proceedings of the IEEE conference on computer vision and pattern recognition, pp. 7794-7803. 2018.

The invention claimed is:

1. A computer-implemented system for predicting classifications for image data, the system comprising a processor, memory and storage, and configured to:
   receive at least one image data sample;
   generate, using a deep neural network, for each image data sample, an activation layer comprising a set of activation vectors;
   encode the set of activation vectors of the generated activation layer;
   perform activation vector correspondence for at least one of the encoded activation vectors based on activation vector distance and conditioned by non-image data; and
   predict at least one classification for each image data sample based on the activation vector correspondence.

2. The system of claim 1, wherein the non-image data includes prediction labels and additional pertinent non-image information.

3. The system of claim 2, wherein the system is further adapted to execute a memory-based prediction model accounting for the non-image information based on a sum-sum accumulation.

4. The system of claim 2, wherein the system is further adapted to execute a memory-based prediction model accounting for the non-image information based on a product-sum accumulation.

5. The system of claim 2, wherein the system is further adapted to estimate a differential prediction between two or more different data points.

6. The system of claim 1, wherein the activation vector correspondence comprises matching at least one of the encoded activation vectors with at least one other activation vector associated with label and non-image data, the at least one other activation vector from previous image data.

7. The system of claim 6, wherein the at least one other activation vector is derived from a different image data sample.

8. The system of claim 1, wherein the activation vector correspondence comprises determining nearest neighbor activation vectors for at least one of the encoded activation vectors, wherein the nearest neighbor activation vectors are associated with label and non-image data.

9. The system of claim 8, wherein each nearest neighbor activation vector is associated with label and non-image data.

10. The system of claim 8, wherein the nearest neighbor activation vectors are located at different space-time locations in different activation layers.

11. The system of claim 1, wherein at least one activation vector is used to index a set of k=2 nearest neighbors stored in memory and associated with label and non-image data.

12. The system of claim 1, wherein the prediction is based on the activation layer of one of the image data samples and non-image data conditioning the prediction.

13. The system of claim 1, the system further configured to index at least one existing activation vector from previous image data using at least one activation vector from the at least one image data sample.

14. The system of claim 1, the system further configured to:
   encode activation layers generated by a generic deep neural network (DNN) from existing image data samples;

store, index and retrieve encoded activation vectors sampled at space-time points in the encoded DNN activation layers along with concurrent non-image data; and whereby, the sensitivity-specificity of correspondence of individual activation vectors within the activation layer can be adjusted based on the distance from an activation layer center.

15. A computer-implemented method of encoding activations generated by a deep neural network from an image, the method comprising:

receiving at least one image data sample;

generating, using a deep neural network, for each image data sample, an activation layer comprising a set of activation vectors;

encoding the set of activation vectors of the generated activation layer;

performing activation vector correspondence for at least one of the encoded activation vectors based on activation vector distance and conditioned by non-image data; and predicting at least one classification for each image data sample based on the activation vector correspondence.

16. The computer-implemented method of claim 15, the method further comprising:

encoding activation layers generated by a generic deep neural network (DNN) from existing image data samples; and storing, indexing and retrieving encoded activation vectors sampled at space-time points in the encoded DNN activation layers along with concurrent non-image data;

whereby, the sensitivity-specificity of correspondence of activation vectors within the activation layer can be adjusted based on the distance from an activation layer center.

17. An apparatus for encoding activations generated by a deep neural network from an image, comprising:

an acquisition device configured to acquire image data samples;

a memory configured to store other activation vectors associated with label and non-image data;

a processor configured to:

generate, using a deep neural network, for each image data sample, an activation layer comprising a set of activation vectors;

encode the set of activation vectors of the generated activation layer;

perform activation vector correspondence between at least one of the encoded activation vectors and at least one of the other activation vectors based on activation vector distance and conditioned by non-image data; and predict at least one classification for each image data sample based on the activation vector correspondence.

18. The apparatus of claim 17, wherein:

the processor is further configured for encoding activation layers generated by a generic deep neural network (DNN) from existing acquired image data samples; and the memory is further configured for storing, indexing and retrieving encoded activation vectors sampled at space-time points in the encoded DNN activation layers along with concurrent non-image information;

whereby, the sensitivity-specificity of correspondence of individual activation vectors within the activation layer can be adjusted based on the distance from an activation layer center.

* * * * *